Dec. 31, 1968     A. E. KRUTH     3,418,673
CHALK BOARD ERASER
Filed Feb. 6, 1967
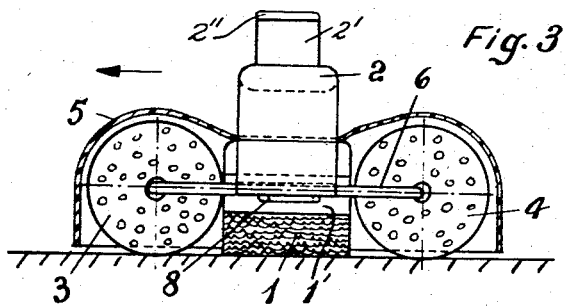
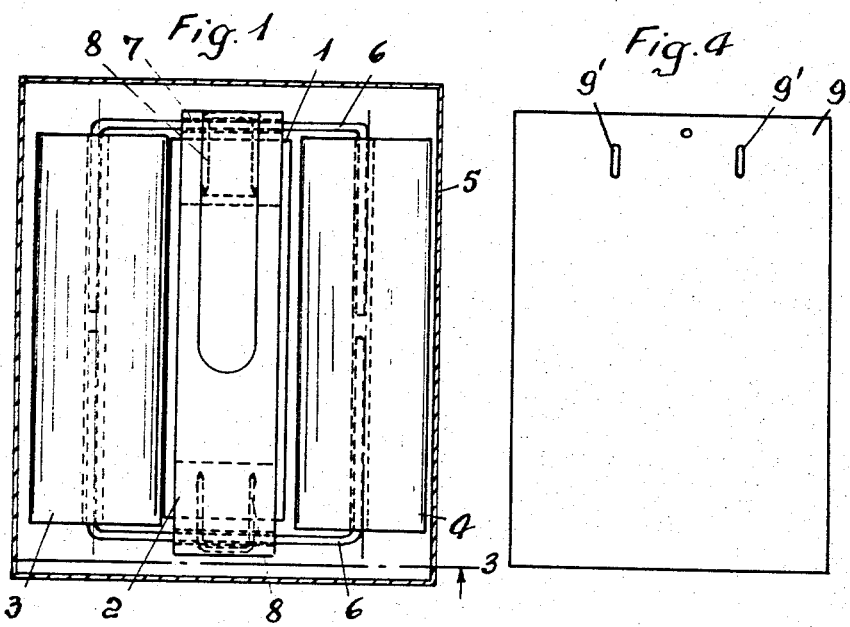
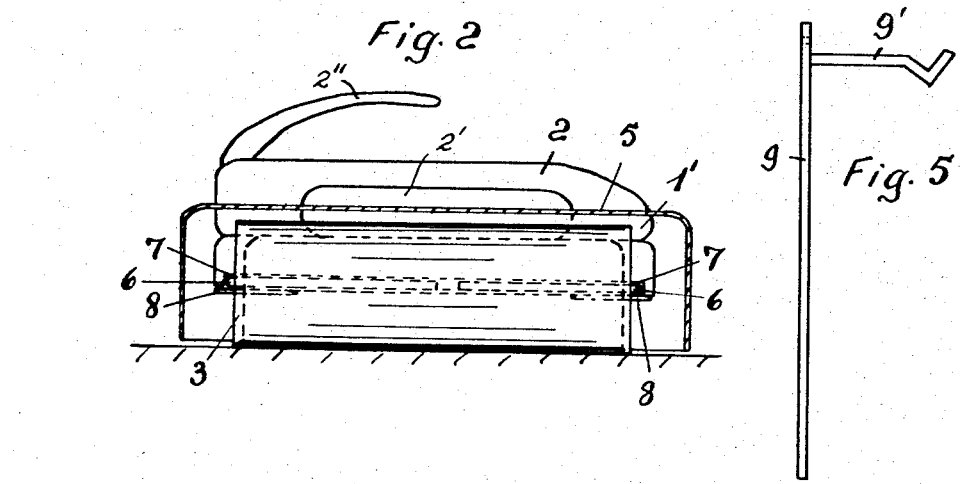
INVENTOR:
ANDRÉ E. KRUTH
by Jacob L. Kolling
ATTORNEY

United States Patent Office 3,418,673
Patented Dec. 31, 1968

3,418,673
CHALK BOARD ERASER
André E. Kruth, 18 Rue de Rome a, Verviers, Belgium
Filed Feb. 6, 1967, Ser. No. 614,069
Claims priority, application Belgium, Feb. 9, 1966,
676,279
3 Claims. (Cl. 15—118)

ABSTRACT OF THE DISCLOSURE

A chalk board eraser comprising a mounting member, a backing member secured to the bottom of the mounting member, a felt wiper secured to the backing member, a pair of cylindrical wipers of porous material rotatably and loosely mounted on each side of the mounting member. Each of the cylindrical wipers is laterally displaceable in a direction opposite the movement of the eraser and engages with the backing member which prevents the rotation of this particular cylindrical wiper. A handle, a cover and a hanging device for the eraser are provided.

---

Much more effective than the simple felt wiper used at present, which always gets filled with chalk which it deposits again on the blackboard and fills the classroom wits dust, the wiper made according to the invention overcomes these two disadvantages. Such a wiper is used dry and it cleans the blackboard quickly and completely.

An apparatus termed wiper according to the invention is characterised in that it comprises a felt wiper arranged at the centre of the apparatus and one or more auxiliary wipers in the form of cylinders adjacent to the said central wiper and fitted to the same mounting as the latter and capable of rotating. According to the invention, the cylindrical auxiliary wipers are covered with porous material.

Other features of the invention will be apparent from the description given hereinafter with reference to the attached drawing, by way of example, which shows in FIGURES 1 and 2 a plan view and front elevation, respectively, of a wiper apparatus according to the invention, the sections passing through the cover; in FIGURE 3 a side elevation in the direction of line 3—3 of FIG. 1 of the same apparatus, and in FIGURES 4 and 5 two views of a support for such an apparatus.

The wiper apparatus made according to the invention and shown in the drawing consists of a felt wiper 1 mounted on a backing member 1' which is secured to a handle 2 of plastic material, which handle is especially designed to form an opening 2' for the fingers and a member 2" for the hand, and two auxiliary cylindrical wipers 3, 4 of porous material such as rough foam plastic, situated on either side of the central wiper.

The cylinders 3, 4 are mounted on two iron rods 6 which are U-shaped with their arms bent at right angles and have the two parallel arms introduced into the cylinders on either side to form pivotal axes such that the ends of the two rods almost meet on each side at the centre of the cylinders whilst the central portions of the U-shaped rods are mounted in notches 7 in the handle 2. A small staple 8 embedded in the backing member 1' at each end underlies the said notches 7. The staples 8 prevent the displacement of the iron rods 6 from the notches 7.

A semi-rigid and transparent cover 5 of plastic material with an opening in its top slightly smaller than the handle, covers the apparatus with the handle projecting therethrough. This cover is simply secured to the apparatus by the frictional engagement of the edges of the opening with the handle.

When the apparatus is moved to and fro, the cylinder 3 that is situated in front of the felt is pressed against backing member 1' for the felt due to the clearance provided for it by the fact that the diameter of the axial rods 6 is less than that of the bore in which they are housed in the cylinder, and the cylinder is thus locked and removes the chalk from the blackboard as it moves over it whilst the second auxiliary wiper 4 continues to rotate on its axis (FIGURE 3). When the wiper is moved in the opposite direction, the locked cylinder 3 is released and ejects from its pores the dust which it has collected whilst the other cylinder 4 now in its turn is locked and cleans the backboard as previously the cylinder 3.

The efficiency with which the blackboard is cleaned is due to the fact that the central felt wiper does not get dirty. It does not encounter the chalk since this has been removed by the lateral wiper cylinders; its function is to polish the blackboard while removing traces of writing which remain after the layer of chalk has been removed. From time to time, one shakes the cover lightly over a receptacle to remove the dust which has collected.

In order that the apparatus may be kept in a suitable position ready for use, it is provided according to the invention with a device on which the apparatus can be suspended on the wall near the blackboard. This device (FIGURES 4 and 5) consists of a board 9 of suitable material provided near the top with two hooks 9' arranged at the same height and at some distance from each other. It will be apparent that the eraser may be suspended on the board by placing the handle 2 on the hooks 9'.

The wiper according to the invention is designed for cleaning school blackboards without wetting them or for any other dry operation for cleaning plane surfaces covered with a layer of dust such as chalk. It is to be understood that such an apparatus may be operated electrically.

I claim:
1. A chalk board eraser comprising a longitudinal mounting member provided with notches extending transversely at the ends thereof, a pair of U-shaped rods, each mounted with its central portion in a respective one of said notches and having leg portion pairs aligned with one another longitudinally and spacedly of said mounting member, on each side thereof, a backing member secured to the bottom portion of said mounting member, a felt wiper secured to said backing member, a pair of auxiliary cylindrical wipers of porous material provided with axial bores and rotatably mounted on the respective pairs of said leg portions, said bores being of a diameter larger than the diameter of said rods, to allow a lateral displacement of said cylindrical wipers to and from said backing member, said cylindrical wipers being engageable with the backing member, the peripheral portions of said cylindrical wipers being dimensioned to engage a surface of a chalk board.

2. A chalk board eraser, according to claim 1, further provided with a handle secured to the top portion of said mounting member.

3. A chalk board eraser, according to claim 2, further provided with a cover of semi-rigid material, said cover having a central opening defined by edge portions in intimate engagement with said handle.

References Cited

UNITED STATES PATENTS

| | | | |
|---|---|---|---|
| 922,148 | 5/1909 | Kariya | 15—532 |
| 1,550,052 | 8/1925 | Anderson | 15—118 XR |
| 1,767,322 | 6/1930 | Snyder | 15—98 |
| 2,336,419 | 12/1943 | Pino | 15—533 |
| 2,955,309 | 10/1960 | Brown | 15—230.11 |
| 3,110,917 | 11/1963 | McPeek | 15—118 |
| 3,163,943 | 1/1965 | Bell | 15—98 XR |

FOREIGN PATENTS

| | | |
|---|---|---|
| 1,092,030 | 11/1954 | France. |
| 213,177 | 3/1924 | Great Britain. |

DANIEL BLUM, *Primary Examiner.*

U.S. Cl. X.R.

15—143, 230.11